May 2, 1961  R. L. OHLS ET AL  2,982,296
GREASE SEAL
Filed Feb. 20, 1959

Harry L. Burgess
Robert L. Ohls
INVENTORS

BY

ATTORNEYS

2,982,296
GREASE SEAL

Robert L. Ohls and Harry L. Burgess, Houston, Tex., assignors to Mission Manufacturing Company, Houston, Tex., a corporation of Texas Filed Feb. 20, 1959, Ser. No. 794,749

9 Claims. (Cl. 137—246.12)

This invention relates to plug valves, and more particularly to seals for plug valves.

An object of this invention is to provide a seal for the valve stem of a plug valve which is positive in action, has a low coefficient of friction, has a minimum number of parts, and does not require tightening of a gland nut, etc. to maintain the seal.

Another object is to provide a seal for a valve stem utilizing relatively hard seal material which will flow under high pressure to effect the seal.

Another object is to provide a grease seal for a plug valve stem.

Another object is to provide a plug valve of the type employing a grease seal to seal between the plug valve member and flow passageway with a grease seal between each valve stem and the valve body, all grease seals being serviced from a single reservoir which is filled through a single fitting carried by a valve stem.

Other objects, features and advantages of the invention will be apparent from the specification, the drawing and the claims.

In the drawing, wherein there is shown an illustrative embodiment of this invention, and wherein like reference numerals indicate like parts;

Figure 1:
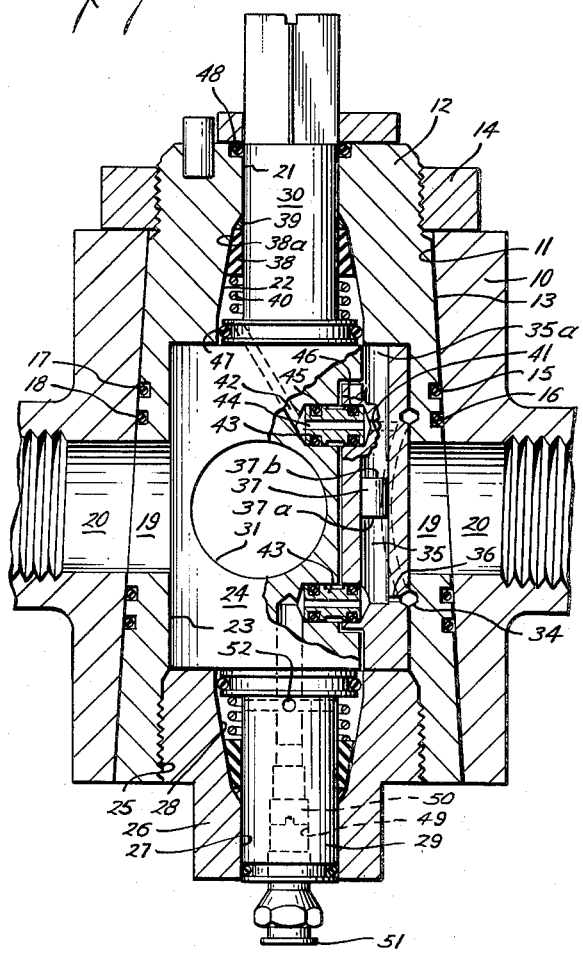
Figure 1 is a view partially in vertical cross section and partially in elevation with parts broken away to illustrate details of the valve.
Figure 2:
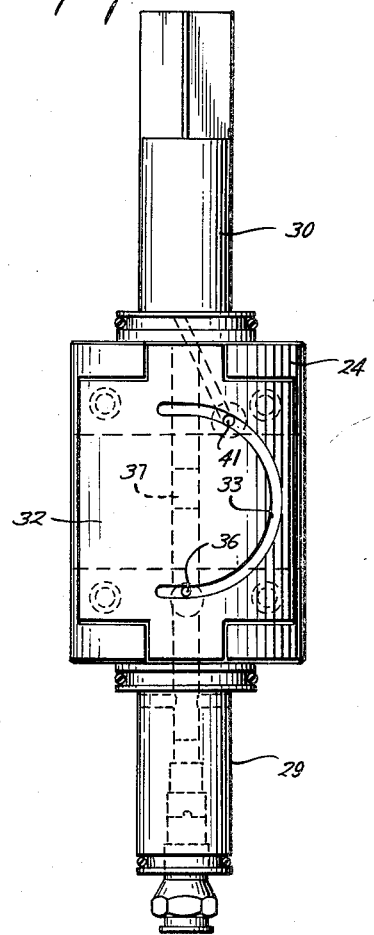
Figure 2 is an elevational view of the plug valve member rotated ninety degrees from its position in Figure 1.
Figure 3:
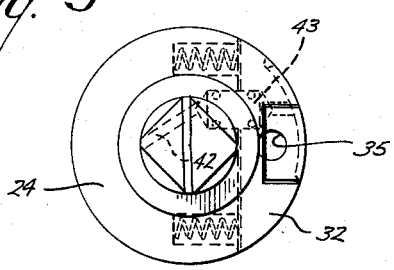
Figure 3 is a top plan view of the plug valve member.

While this invention might be utilized with any type plug valve, it is shown in the illustrative embodiment in an insert type of plug valve. The flow conduit to be controlled has an enlarged section which might be termed a receptacle 10. The receptacle is provided with an internal frustro-conical bore 11 which receives the valve body 12. The exterior surface of body 12 is provided with a frustro-conical surface 13 which mates with surface 11 and the valve is held firmly in position by a nut 14. Seal means such as O-rings 15, 16, 17 and 18 seal between the valve body and the receptacle. The valve body has a flowway 19 extending therethrough which is arranged in alignment with a flowway 20 extending through receptacle 10.

The body 12 has an internal bore extending therethrough. This bore includes a small diameter portion 21 functioning as a journal, a slightly larger frustro-conical section 22 which provides a grease and seal cavity, a still larger cylindrical section 23 which provides a seat for valve member 24, and a threaded section 25. A plug 26 is threadedly secured in the threaded section 25 of the bore. The plug 26 is provided with a bore therethrough which includes a section 27 which functions as a journal, and a frustro-conical section 28 which acts as a grease and seal cavity and is identical with the frustro-conical section 22 of the bore through the body. The bore through the body and the bore through the cap may be considered as a single bore in operation of the valve.

The plug valve member 24 is provided with oppositely extending stems 29 and 30 which are mounted in journals 21 and 27. The bore through the body interrupts the passageway 19, and when the valve 24 is assembled within the bore through the body the flowway 31 through the valve member is positioned to be rotated into and out of register with the flowway 19 through the body.

The plug valve member 24 is provided with a free floating segment 32 which may be envisioned as a section of a cylinder which has been divided from the cylinder by a cord of the cylinder.

Means are provided for sealing between the free floating section 32 and the bore through the body by a pair of cooperating crescent-shaped grease grooves. The open end of these grooves face each other and one groove 33 is carried on the exterior surface of valve section 32, and the other groove 34 is provided in the internal surface of the bore through the valve body. The crescent-shaped groove in the valve body surrounds a little more than one-half of flowway 19 on the downstream side. When the plug valve member 24 is rotated to closed position, as shown in Figure 1, the two crescent-shaped grooves meet at their open ends and form a continuous seal about flowway 19.

Means for maintaining a grease or plastic packing in grooves 33 and 34 are provided. Preferably, this means includes a reservoir 35 connected with the crescent-shaped grooves through a passageway 36 and filled with plastic packing or grease of any desired composition. Within the reservoir there is provided a pressure responsive member such as piston 37 which is exposed to grease on the end 37a, and is exposed to upstream pressure on its end 37b. It will be noted that the upper end 35a of the cylindrical bore through the member 32 which provides the reservoir 35 extends through the member 32 and is exposed to upstream pressure. On the other hand, the lower end of the cylindrical bore which provides reservoir 35 does not extend through the floating member 32 and is not exposed to upstream pressure.

The two seals provided between the valve body and valve stems are identical and, therefore, only one will be explained in detail. It will be understood, of course, that one of the stems could terminate short of the exterior of the valve body in the conventional manner, and in this case only a single seal would be necessary. In very high pressure installations, a double stem valve which extends to the exterior of the valve body is preferred as it results in a balanced valve which is much more easily rotated than an unbalanced valve.

In the frustro-conical bore section 22 there is provided a seal member 38 having an external frustro-conical surface 38a which mates with the bore 22. That is, its larger diameter end is adjacent to the flow passageway. The seal member 38 is formed of a relatively hard rubber-like material, such as Teflon, and due to the high pressure within the valve being exerted across this seal member, it has been found that it will conform very closely to the bore of the body and provide an excellent seal. Teflon and kindred materials have a very low coefficient of friction, are chemically inert to many acids and alkalis and have a very long life.

As the seal member 38 is made of a flowable material, it is preferred to provide a backup ring 39 at the small diameter end of the frustro-conical bore 22. This backup ring 39 should be formed of a material which is harder than seal ring 38. For example, a malleable material under extremely high pressure will conform to the wedge-shaped groove in which it is seated and prevent the extrusion of the seal member 38. Preferably, the backup ring 39 is fabricated of bronze.

In order to insure proper placement of seal ring 38, it is preferred to provide a resilient means such as compression spring 40 urging the seal member into firm contact with bore 22.

In order to further insure that a complete seal will occur between seal member 38 and the stem and body, it is preferred to introduce a plastic packing or grease under pressure into the cavity formed by bore 22 so that any tendency to leak past the seal member 38 will cause flow of grease into the leaking area and prevent the leak. For this purpose communication is provided between the reservoir 35 and the cavity 22. In the form of valve illustrated, a passageway 41 extends from grease groove 33 through the floating segment 32. This passageway communicates with a passageway 42 leading to cavity 22 through a floating connector shown at 43. The connector 43 has a bore 44 therethrough and spaced O-rings 45 and 46 seal between the connector and the plug valve member 24 and floating segment 32, respectively. Thus, plastic packing is forced by piston 37 through the crescent-shaped seal ring 33 to passageway 41, thence through the connector 43 to passageway 42, and thence to the cavity 22.

A grease retainer 47 is provided by an O-ring which bridges the space between the valve stem and the body on the side of the cavity 22 adjacent passageway 19. There is no differential across this O-ring and the tolerances are not such as to provide a seal. The O-ring merely retains grease within cavity 22.

A dust seal 48 is provided at the extremity of body 12 and seals against dust entering into bore 21. This O-ring is not intended to act as a seal member, but it is apparent that it could be so designed if desired.

Grease is fed into the reservoir 35 through a passageway shown in dotted lines at 49. This passageway extends axially through stem 29 and communicates with reservoir 35 through a second floating connector 43. A check valve shown in dotted outline at 50 is positioned in passageway 49 to insure against back flow of grease. A grease fitting 51 is provided at the extremity of passageway 49 for coupling to a grease gun for filling the system.

The grease cavity 28 is provided with grease through one or more lateral passages 52 which interconnect the passageway 49 with the exterior of stem 29 within the cavity 28.

It should be noted that all of the grease seals of the valve are fed from a single reservoir and the single reservoir is charged with grease through a single charging opening which is carried in the valve stem. This greatly simplifies the structure and is particularly advantageous where a valve body of thin wall section, such as shown in Figure 1, is utilized.

In operation, the valve is assembled in the manner shown in Figure 1. Grease is charged into the reservoir 35 by a gun coupled to fitting 51. If desired, the various cavities and reservoirs may be pre-packed with grease and the packing completed by introducing grease through fitting 50 after the valve is assembled. With the valve in closed position, upstream pressure is exerted on surface 37b of piston 37 to pressurize the plastic packing within reservoir 35. This pressure insures grease filling the crescent-shaped grease grooves and flowing into cavity 22 to seal about stem 30. This pressure also reverses flow of grease in passageway 49 to force it through passageways 52 into the grease cavity 28 and seal about stem 29.

When the valve is rotated to open position, the throughway 31 aligns with flowway 19. At this time, upstream pressure surrounds the entire valve member, and, therefore, there is no pressure differential across the groove 33. However, pressure will be active on the passageway 41 and on the passageway 49 to maintain pressure on the grease within the grease cavities 22 and 28. Thus, at all times grease is maintained under pressure behind the Teflon seals 38 to insure against leakage past the valve stems.

For a full discussion of the crescent-shaped grease seal and its manner of operation, see the patent to Sharp No. 2,269,887.

The foregoing disclosure and description of the invention is illustrative and explanatory thereof, and various changes in the size, shape and materials, as well as in the details of the illustrated construction, may be made without in the scope of the appended claims without departing from the spirit of the invention.

What is claimed is:

1. A valve comprising, a body having a flow passageway therethrough, a bore in the body interrupting the passageway, a rotatable plug valve member controlling flow through the passageway, said valve member mounted on a stem journalled in said bore, an annular grease cavity between the stem and body, a seal between the stem and body at the extremity of the cavity remote from the passageway, a grease groove between the body and valve member surrounding the passageway when the valve is closed, said groove formed partially in the valve member and partially in the body, a grease reservoir in the valve member, means providing communication between the reservoir and each of the grease groove and cavity, and pressure responsive means in the reservoir and exposed to upstream pressure when the valve is closed for forcing grease from the reservoir into the groove and cavity.

2. The valve of claim 1 wherein said seal is provided by a seal ring of relatively hard rubber-like material which has an exterior frustro-conical surface with the large diameter end facing the passageway and engaging a complementary surface on one of the valve body and stem, and resilient mean urging said seal ring away from the passageway.

3. The valve of claim 1 wherein the valve stem has an axial passage therethrough communicating with said reservoir to fill same, and a radial passageway from said axial passageway to the grease cavity providing for communication between the cavity and reservoir.

4. The valve of claim 1 wherein the seal ring is made of Teflon.

5. A valve comprising, a body having a flow passageway therethrough, a bore extending through the body and interrupting the passageway, a rotatable plug valve member controlling flow through the passageway, said valve member mounted on oppositely extending stems rotatably journalled in the bore, said bore enlarged on each side of the passageway to provide an annular grease cavity between each stem and the body, spaced seals between each stem and the body at the extremities of each cavity, a grease groove between the body and valve member surrounding the passageway when the valve is closed, said groove formed partially in the valve member and partially in the body, a grease reservoir in the valve member, means providing communication between the reservoir and each of the grease groove and grease cavities, and pressure responsive means in the reservoir and exposed to upstream pressure when the valve is closed for forcing grease from the reservoir to the groove and cavities.

6. The valve of claim 5 wherein the exterior of said spaced seals are provided by seal rings of relatively hard rubber-like material which has an exterior frustro-conical surface with the large diameter ends facing the passageway and engaging a like complementary surface on one of the valve body and stem, and resilient means urging said seal rings away from the passageway.

7. The valve of claim 5 wherein one valve stem has an axial passage therethrough communicating with said reservoir to fill same, and a radial passageway extends from said axial passageway to the grease cavity surrounding said one stem and provides for communication between the last mentioned cavity and the reservoir.

8. The valve of claim 5 wherein the exterior of said spaced seals are fabricated from Teflon.

9. The valve of claim 5 wherein the exterior of said spaced seals are fabricated from Teflon and have exterior frustro-conical surfaces; resilient means urges the exterior seals away from the flow passageway; and back-up rings of material more rigid than said exterior seals, but deformable under high pressure, are provided at the small diameter ends of said exterior seals.

References Cited in the file of this patent

UNITED STATES PATENTS

| | | |
|---|---|---|
| 1,597,254 | Vogel | Aug. 24, 1926 |
| 1,657,841 | Peris | Jan. 31, 1928 |
| 2,269,887 | Sharp | Jan. 13, 1942 |
| 2,279,472 | Leach | Apr. 14, 1942 |
| 2,300,835 | Volpin | Nov. 3, 1942 |
| 2,567,527 | Parks | Sept. 11, 1951 |
| 2,568,935 | Smith | Sept. 25, 1951 |
| 2,765,185 | Mott | Oct. 2, 1956 |
| 2,805,040 | Voss | Sept. 3, 1957 |